US012705982B2

(12) United States Patent
Tsujino et al.

(10) Patent No.: US 12,705,982 B2
(45) Date of Patent: Aug. 11, 2026

(54) INFORMATION PROCESSING DEVICE

(71) Applicant: TOYOTA JIDOSHA KABUSHIKI KAISHA, Toyota (JP)

(72) Inventors: Miki Tsujino, Nagakute (JP); Sara Yamafuji, Miyoshi (JP); Makoto Suzuki, Seto (JP); Takatoshi Hattori, Nagoya (JP); Keigo Hori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 18/485,645

(22) Filed: Oct. 12, 2023

(65) Prior Publication Data

US 2024/0249626 A1 Jul. 25, 2024

(30) Foreign Application Priority Data

Jan. 20, 2023 (JP) ................................ 2023-007604

(51) Int. Cl.
*G08G 1/16* (2006.01)

(52) U.S. Cl.
CPC .................................... *G08G 1/167* (2013.01)

(58) Field of Classification Search
CPC ............................... G08G 1/166; G08G 1/167
See application file for complete search history.

(56) References Cited

U.S. PATENT DOCUMENTS 6,373,400 B1 4/2002 Fujita et al.
2014/0285364 A1* 9/2014 Chen ...................... G08G 1/167 340/988
2016/0159280 A1* 6/2016 Takazawa .............. B60K 35/00 345/8
2017/0225691 A1* 8/2017 Yamada ................ G06F 3/0486
2018/0218713 A1* 8/2018 Kusanagi ............... B60K 35/28
2018/0257489 A1* 9/2018 Watanabe ........... B60W 30/165
2020/0189614 A1 6/2020 Ito et al.
2020/0369151 A1 11/2020 Nakajima et al.
2023/0022485 A1* 1/2023 Fujita ..................... G09G 3/002

FOREIGN PATENT DOCUMENTS

JP 2001-063401 A 3/2001
JP 2019-148935 A 9/2019
JP 2020-098396 A 6/2020
JP 2020-189549 A 11/2020

* cited by examiner

*Primary Examiner* — Xiao M Wu
(74) *Attorney, Agent, or Firm* — SoraIP, Inc.

(57) ABSTRACT

An information processing device includes a control unit that displays, when another vehicle that is running in front of an own vehicle in a traveling direction is detected by a detection unit, a graphic image in which information related to inter-vehicle time required for the own vehicle to reach a position at which the other vehicle exists is schematized on a display unit in the own vehicle, and another vehicle image in which the other vehicle is shown in a position at which an inter-vehicle distance between the own vehicle and the other vehicle is reflected on a front side of the graphic image in the traveling direction without being overlapped with the graphic image.

10 Claims, 6 Drawing Sheets

INFORMATION PROCESSING DEVICE

CROSS-REFERENCE TO RELATED APPLICATION

This application claims priority to Japanese Patent Application No. 2023-007604 filed on Jan. 20, 2023, incorporated herein by reference in its entirety.

BACKGROUND

1. Technical Field

The present disclosure relates to an information processing device.

2. Description of Related Art

Japanese Unexamined Patent Application Publication No. 2020-189549 (JP 2020-189549 A) discloses a technique for displaying a bar graph on a display unit. In the bar graph, as information related to the inter-vehicle distance between an own vehicle and another vehicle traveling in front of the own vehicle in the traveling direction of the own vehicle, the length of a bar along the extension direction of the road changes in accordance with the inter-vehicle distance.

SUMMARY

Here, in the technique of JP 2020-189549 A, in a case where an icon showing the other vehicle is displayed on the front side of the bar graph in the traveling direction, the icon is displayed while overlapping with the bar graph when the inter-vehicle distance between the own vehicle and the other vehicle suddenly becomes small, and the occupant may be confused in recognizing the situation.

Accordingly, an object of the present disclosure is to provide an information processing device capable of displaying the contents that suppress confusing the occupant in recognizing the situation on an in-vehicle display.

An information processing device according to at least one embodiment of the instant application includes a control unit that displays, when another vehicle that is running in front of an own vehicle in a traveling direction is detected by a detection unit, a graphic image in which information related to inter-vehicle time required for the own vehicle to reach a position at which the other vehicle exists is schematized on a display unit in the own vehicle, and another vehicle image in which the other vehicle is shown in a position at which an inter-vehicle distance between the own vehicle and the other vehicle is reflected on a front side of the graphic image in the traveling direction without being overlapped with the graphic image.

In the information processing device according to at least one embodiment of the instant application, a control unit displays, when another vehicle is detected by a detection unit, a graphic image on a display unit, and another vehicle image in a position at which an inter-vehicle distance between the own vehicle and the other vehicle is reflected on a front side of the graphic image in the traveling direction without being overlapped with the graphic image. Here, when the other vehicle image and the graphic image are displayed in an overlapping manner on the display unit, a gap may be generated in relation to the actual inter-vehicle distance, and the occupant may be confused in recognizing the situation. However, in the information processing device, the other vehicle image that is displayed in the position at which the inter-vehicle distance between the own vehicle and the other vehicle is reflected does not overlap with the graphic image. Therefore, the contents that suppress confusing the occupant in recognizing the situation can be displayed on the display unit.

In the information processing device according to at least one embodiment of the instant application, the control unit performs control, when the inter-vehicle distance between the own vehicle and the other vehicle changes, so as not to overlap the other vehicle image with the graphic image by changing a position of the other vehicle image along the traveling direction and changing a dimension of the graphic image along the traveling direction according to the changed inter-vehicle distance.

In the information processing device according to at least one embodiment of the instant application, the control unit performs control, when the inter-vehicle distance between the own vehicle and the other vehicle changes, so as not to overlap the other vehicle image with the graphic image by changing a position of the other vehicle image along the traveling direction and changing a dimension of the graphic image along the traveling direction according to the changed inter-vehicle distance. As a result, in the information processing device, for example, even when the inter-vehicle distance suddenly becomes small, the other vehicle image does not overlap with the graphic image. Therefore, confusing the occupant in recognizing the situation can be suppressed.

In the information processing device according to at least one embodiment of the instant application, the control unit displays, when a different vehicle that has entered between the own vehicle and the other vehicle is detected by the detection unit, a different vehicle image in which the different vehicle is shown in a position at which an inter-vehicle distance between the own vehicle and the different vehicle is reflected on the front side of the graphic image in the traveling direction without being overlapped with the graphic image, instead of the other vehicle image.

In the information processing device according to at least one embodiment of the instant application, the control unit displays, when a different vehicle that has entered between the own vehicle and the other vehicle is detected by the detection unit, a different vehicle image in a position at which an inter-vehicle distance between the own vehicle and the different vehicle is reflected on the front side of the graphic image in the traveling direction without being overlapped with the graphic image, instead of the other vehicle image. Here, when the different vehicle image is displayed on the rear side of the other vehicle image in the traveling direction on the display unit, the occupant may be confused in recognizing the situation due to overlapping of the different vehicle image and the graphic image. However, in the information processing device, the different vehicle image that is displayed in the position at which the inter-vehicle distance between the own vehicle and the different vehicle is reflected instead of the other vehicle image does not overlap with the graphic image. Therefore, confusing the occupant in recognizing the situation can be suppressed.

In the information processing device according to at least one embodiment of the instant application, the control unit notifies an occupant of presence of the different vehicle using a predetermined notification unit when the different vehicle is detected by the detection unit.

In the information processing device according to at least one embodiment of the instant application, the control unit notifies an occupant of presence of the different vehicle using a predetermined notification unit when the different vehicle is detected by the detection unit. Thus, the information processing device allows the occupant to grasp the presence of the different vehicle.

In the information processing device according to at least one embodiment of the instant application, the control unit notifies the occupant of the presence of the different vehicle by at least one of changing color of the graphic image and outputting sound from a speaker.

In the information processing device according to at least one embodiment of the instant application, the control unit notifies the occupant of the presence of the different vehicle by at least one of changing color of the graphic image and outputting sound from a speaker. Thus, the information processing device allows the occupant to grasp the presence of the different vehicle through at least one of vision and audition of the occupant.

As described above, in the information processing device according to the present disclosure, the contents that suppress confusing the occupant in recognizing the situation can be displayed on the in-vehicle display.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An example of an embodiment of the present disclosure will be described in detail below with reference to the drawings.

First Embodiment

First, a first embodiment of an in-vehicle system 10 according to this embodiment will be described.

Figure 1:
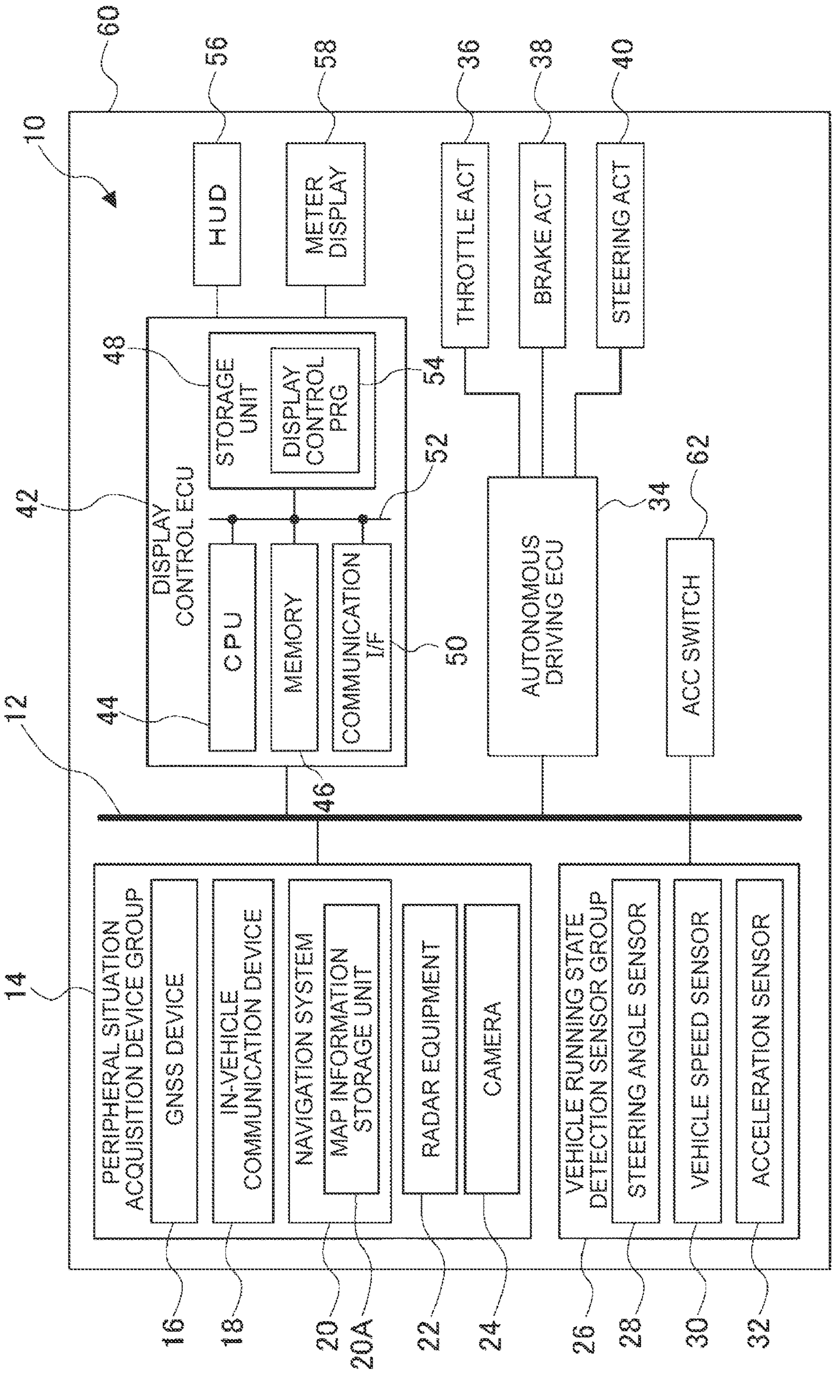
FIG. 1 is a block diagram showing a schematic configuration of an in-vehicle system.

FIG. 1 is a block diagram showing a schematic configuration of an in-vehicle system 10 mounted on a vehicle 60. As shown in FIG. 1, the in-vehicle system 10 has a communication bus 12. A peripheral situation acquisition device group 14, a vehicle running state detection sensor group 26, an adaptive cruise control (ACC) switch 62, an automatic driving electronic control unit (ECU) 34, and a display control ECU 42 are each connected to the communication bus 12. Note that FIG. 1 shows only a partial configuration of the in-vehicle system 10. Also, the vehicle 60 on which the in-vehicle system 10 is mounted is hereinafter referred to as the own vehicle 60. Own vehicle 60 is an example of "own vehicle". The peripheral situation acquisition device group 14 is an example of a "detection unit". The display control ECU 42 is an example of an "information processing device".

The peripheral situation acquisition device group 14 includes a global navigation satellite system (GNSS) device 16, an in-vehicle communication device 18, a navigation system 20, a radar device 22, and a camera 24, as a device to acquire information that represents what kind of situation is the surrounding environment of the own vehicle 60 in.

The GNSS device 16 receives GNSS signals from a plurality of GNSS satellites and measures the position of the own vehicle 60. The in-vehicle communication device 18 is a communication device that performs at least one of inter-vehicle communication with the other vehicle and road-to-vehicle communication with a roadside device. The navigation system 20 includes a map information storage unit 20A that stores map information, and maps the position of the own vehicle 60 based on the position information obtained from the GNSS device 16 and the map information stored in the map information storage unit 20A. It performs processing such as displaying on the top and guiding the route to the destination.

The radar device 22 detects objects such as pedestrians and the other vehicle existing around the own vehicle 60 as point group information, and acquires the relative position and relative speed between the detected objects and the own vehicle 60. The radar device 22 then outputs information such as the acquired relative position and relative velocity. The camera 24 photographs the surroundings of the own vehicle 60 with a plurality of cameras and outputs the photographed images.

The vehicle running state detection sensor group 26 includes a plurality of sensors for acquiring the running state of the own vehicle 60, such as a steering angle sensor 28 for detecting the steering angle of the own vehicle 60 and a vehicle speed sensor for detecting the running speed of the own vehicle 60. 30 and an acceleration sensor 32 for detecting acceleration applied to the own vehicle 60.

The ACC switch 62 is a switch that can switch on/off the inter-vehicle time control ACC and set a designated value of the headway time control in the inter-vehicle time control ACC. The inter-vehicle time control ACC is the ACC that controls running so that the inter-vehicle time required for the own vehicle 60 to reach the position where the other vehicle running in front of the own vehicle 60 in the traveling direction (hereinafter referred to as "preceding vehicle to be followed") is present becomes the specified value. The ACC switch 62 may be a physical switch or a virtual switch.

The automatic driving ECU 34 is connected to a throttle ACT 36 that changes the throttle opening of the own vehicle 60 and a brake ACT 38 that changes the braking force generated by the braking device of the own vehicle 60. The automatic driving ECU 34 is also connected to a steering ACT 40 that changes the amount of steering by the steering device of the own vehicle 60. The automatic driving ECU 34 is an ECU that performs automatic driving processing for automatically driving the own vehicle 60 without any driving operation by the occupant of the own vehicle 60.

Although not shown, the automatic driving ECU 34 includes a central processing unit (CPU), a read only memory (ROM), a random access memory (RAM) memory, a non-volatile storage unit such as a hard disk drive (HDD) or a solid state drive (SSD), and a communication interface (I/F). The storage unit stores automatic driving software. The automatic driving ECU 34 functions as the reception unit 64 and the travel control unit 66 shown in FIG. 2 by the CPU executing the automatic driving software. Details of the reception unit 64 and the travel control unit 66 will be described later.

The display control ECU 42 is connected to a head-up display (hereinafter referred to as HUD) 56 and meter display 58. The display control ECU 42 is an ECU that controls information display on the HUD 56 and the meter display 58. The HUD 56 according to the present embodiment is a small HUD whose display range is part of the forward field of view of the occupant of the own vehicle 60 due to reflection on the windshield glass or the like. Moreover, the meter display 58 is a display provided on the instrument panel of the own vehicle 60. The meter display 58 is an example of a "display unit".

The display control ECU 42 also includes a CPU 44, ROM and RAM memory 46, a non-volatile storage unit 48 such as an HDD or SSD, and a communication I/F 50. The CPU 44, memory 46, storage unit 48, and communication I/F 50 are connected via an internal bus 52 so as to be able to communicate with each other. The storage unit 48 stores a display control program 54. The display control ECU 42 reads out the display control program 54 from the storage unit 48 and develops it in the memory 46, and the display control program 54 is executed by the CPU 44, so that the display control ECU 42 functions as the acquisition unit 68 and the display control unit 70 shown in FIG. 2. Details of the acquisition unit 68 and the display control unit 70 will be described later.

Figure 2:
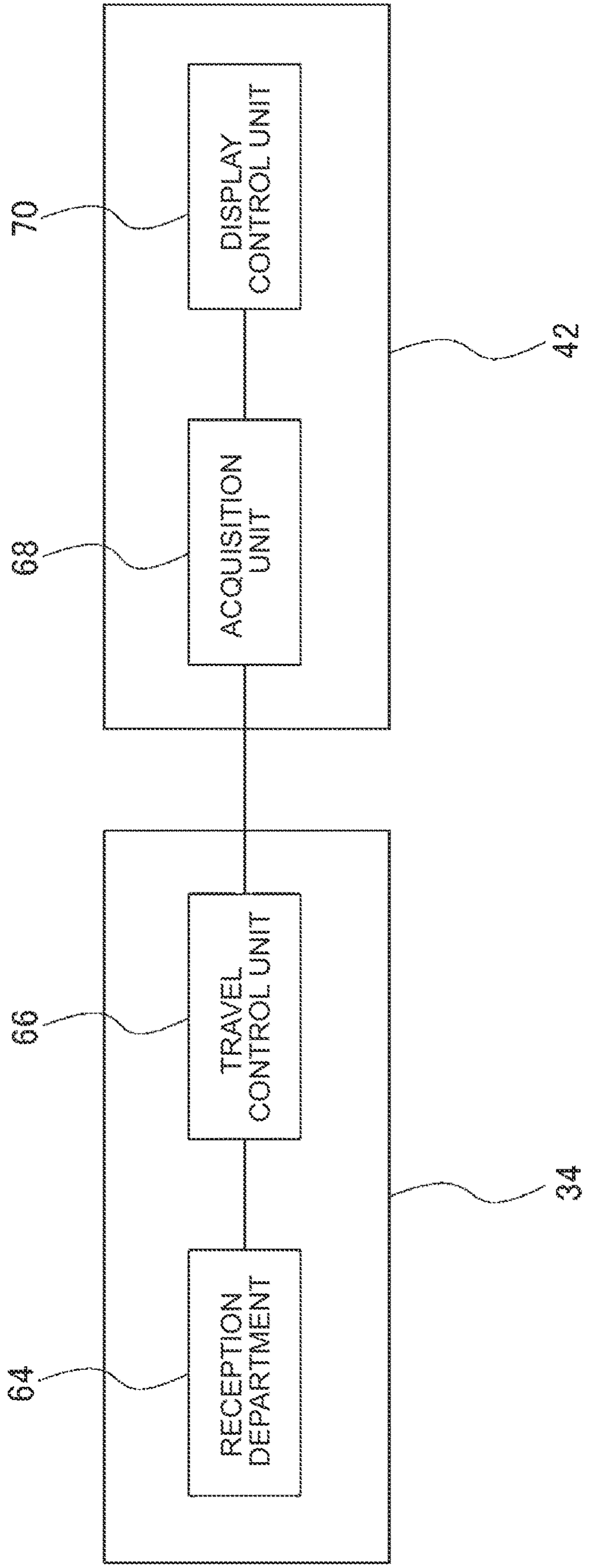
FIG. 2 is a functional block diagram of an automatic driving ECU and a display control ECU.

FIG. 2 is a functional block diagram of the automatic driving ECU 34 and the display control ECU 42. As shown in FIG. 2, the automatic driving ECU 34 functions as a reception unit 64 and a travel control unit 66. The display control ECU 42 also functions as an acquisition unit 68 and a display control unit 70.

Accepting unit 64 accepts the specified value of the inter-vehicle time in inter-vehicle time control ACC set via ACC switch 62. In this embodiment, as an example, the inter-vehicle time level is classified into four stages of "large", "medium", "small", and "minimum". Therefore, the reception unit 64 receives information indicating which of the above four stages is designated as the designated value of the inter-vehicle time.

When the inter-vehicle time control ACC is turned on via the ACC switch 62, the travel control unit 66 controls the inter-vehicle time detected value between the own vehicle 60 and the preceding vehicle to be tracked as the inter-vehicle distance received by the reception unit 64. The running of the own vehicle 60 is controlled so as to correspond to the specified value of time. Specifically, the travel control unit 66 controls the throttle ACT 36, the brake ACT, and the like based on information obtained from the peripheral situation acquisition device group 14 and the vehicle running state detection sensor group 26 so that the detection value corresponds to the specified value. 38, and the steering ACT 40 to perform inter-vehicle time control ACC.

Controlling the detected value so as to correspond to the specified value can be realized by, for example, the following method. For example, a conversion table prescribing the relationship between the specified value of the inter-vehicle time and the inter-vehicle distance for each vehicle speed is stored in the storage unit of the automatic driving ECU 34, and the target value of the inter-vehicle distance corresponding to the vehicle speed and the specified value of the inter-vehicle time is obtained by the automatic driving ECU 34 using the conversion table. As a function of the travel control unit 66, the automatic driving ECU 34 performs control so that the detected value of the inter-vehicle distance between the own vehicle 60 and the preceding vehicle to be followed matches the target inter-vehicle distance.

The acquisition unit 68 acquires the vehicle speed of the own vehicle 60 from the vehicle speed sensor 30. The acquisition unit 68 obtains from the radar device 22 the inter-vehicle distance between the own vehicle 60 and the preceding vehicle to be followed. The acquisition unit 68 obtains from the ACC switch 62 the specified value of the inter-vehicle time between the own vehicle 60 and the preceding vehicle to be followed. Information acquired by the acquisition unit 68 from the vehicle speed sensor 30, the radar device 22, the ACC switch 62, and the like is hereinafter collectively referred to as "detection information".

The display control unit 70 controls display contents of the meter display 58. For example, while the own vehicle 60 is running, the display control unit 70 designates an own vehicle icon 72 indicating the own vehicle 60, the other vehicle icon 74 indicating a preceding vehicle to be followed, and an inter-vehicle time as information related to the inter-vehicle time. A bar graph 76 showing the value and the inter-vehicle distance can be displayed on the meter display 58 (see FIGS. 4 to 6). The display control unit 70 is an example of the "control unit", the other vehicle icon 74 is an example of the "other vehicle image", and the bar graph 76 is an example of the "graphic image".

Figure 3:
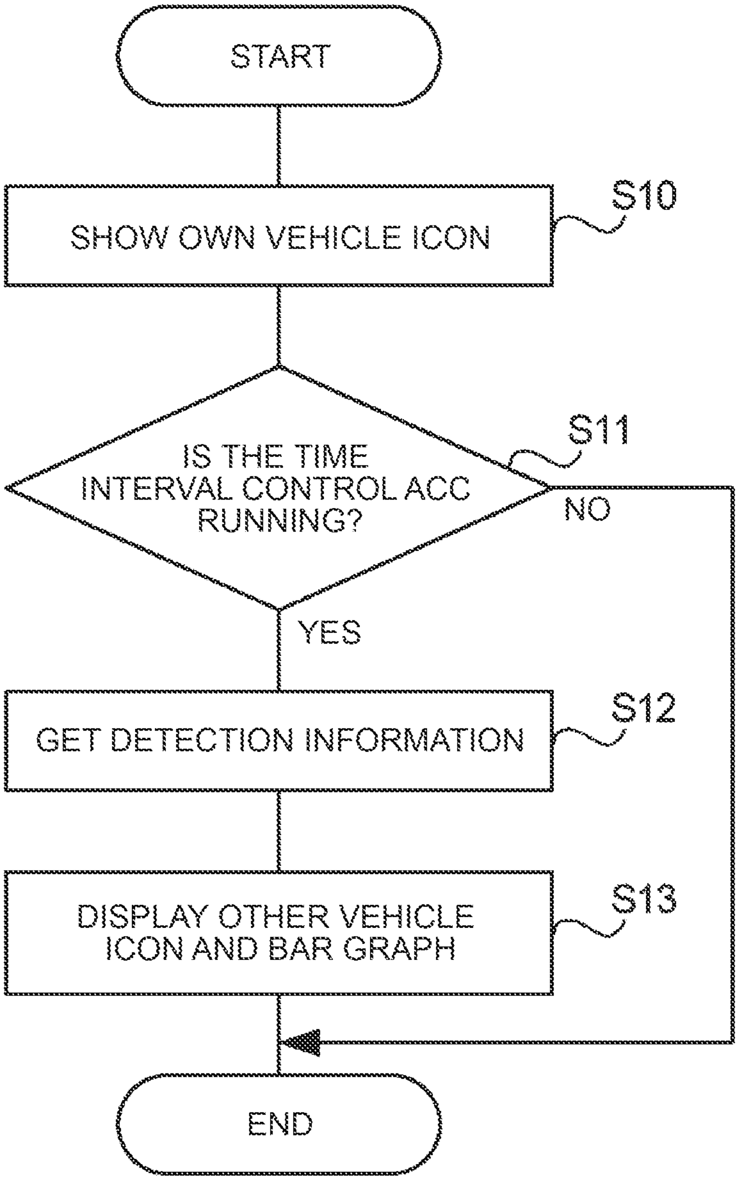
FIG. 3 is a flowchart showing the flow of control processing.

FIG. 3 is a flowchart showing the flow of control processing in which the display control ECU 42 controls the display contents of the meter display 58. Control processing is performed by the CPU 44 reading out the display control program 54 from the storage unit 48, developing it in the memory 46, and executing it. As an example, the control process shown in FIG. 3 is periodically executed while the own vehicle 60 is running.

In S10 shown in FIG. 3, the CPU 44 causes the own vehicle icon 72 to be displayed at a predetermined position on the meter display 58. Then, the CPU 44 proceeds to S11.

In S11, the CPU 44 determines whether the inter-vehicle time control ACC is being executed. Here, when the CPU 44 determines that the inter-vehicle time control ACC is being executed (S11: YES), the process proceeds to S12. On the other hand, if the CPU 44 does not determine that the inter-vehicle time control ACC is being executed (S11: NO), it ends the control process. In this embodiment, the CPU 44 determines that the inter-vehicle time control ACC is being executed when the inter-vehicle time control ACC is turned on via the ACC switch 62.

In S12, the CPU 44 acquires, as detection information, specified values for the vehicle speed of the own vehicle 60, the inter-vehicle distance to the preceding vehicle to be followed, and the inter-vehicle time to the preceding vehicle to be followed. Specifically, the CPU 44 acquires the vehicle speed of the own vehicle 60 from the vehicle speed sensor 30. The CPU 44 acquires from the radar device 22 the inter-vehicle distance to the preceding vehicle to be followed. The CPU 44 acquires from the ACC switch 62 the specified value of the inter-vehicle time to the preceding vehicle to be tracked. Then, the CPU 44 proceeds to S13.

At S13, the CPU 44 causes the other vehicle icon 74 and the bar graph 76 to be displayed at predetermined positions on the meter display 58. Specifically, the CPU 44 causes the other vehicle icon 74 to be displayed on the forward side of the own vehicle icon 72 in the traveling direction, at a position reflecting the inter-vehicle distance between the own vehicle 60 and the preceding vehicle to be followed. In addition, the CPU 44 displays a bar graph 76 in which one or more rectangular bars 78 (see FIGS. 4 to 6) are arranged along the traveling direction between the own vehicle icon 72 and the other vehicle icon 74. In this case, the CPU 44 displays the other vehicle icon 74 so as not to overlap the bar graph 76. Specifically, the CPU 44 displays the other vehicle icon 74 on the front side of the bar graph 76 in the traveling direction, thereby controlling the other vehicle icon 74 and the bar graph 76 not to be superimposed. Then, the CPU 44 terminates the control process.

Next, a display example displayed on the meter display 58 as a result of the control processing shown in FIG. 3 being performed by the display control ECU 42 will be described.

Figure 4:
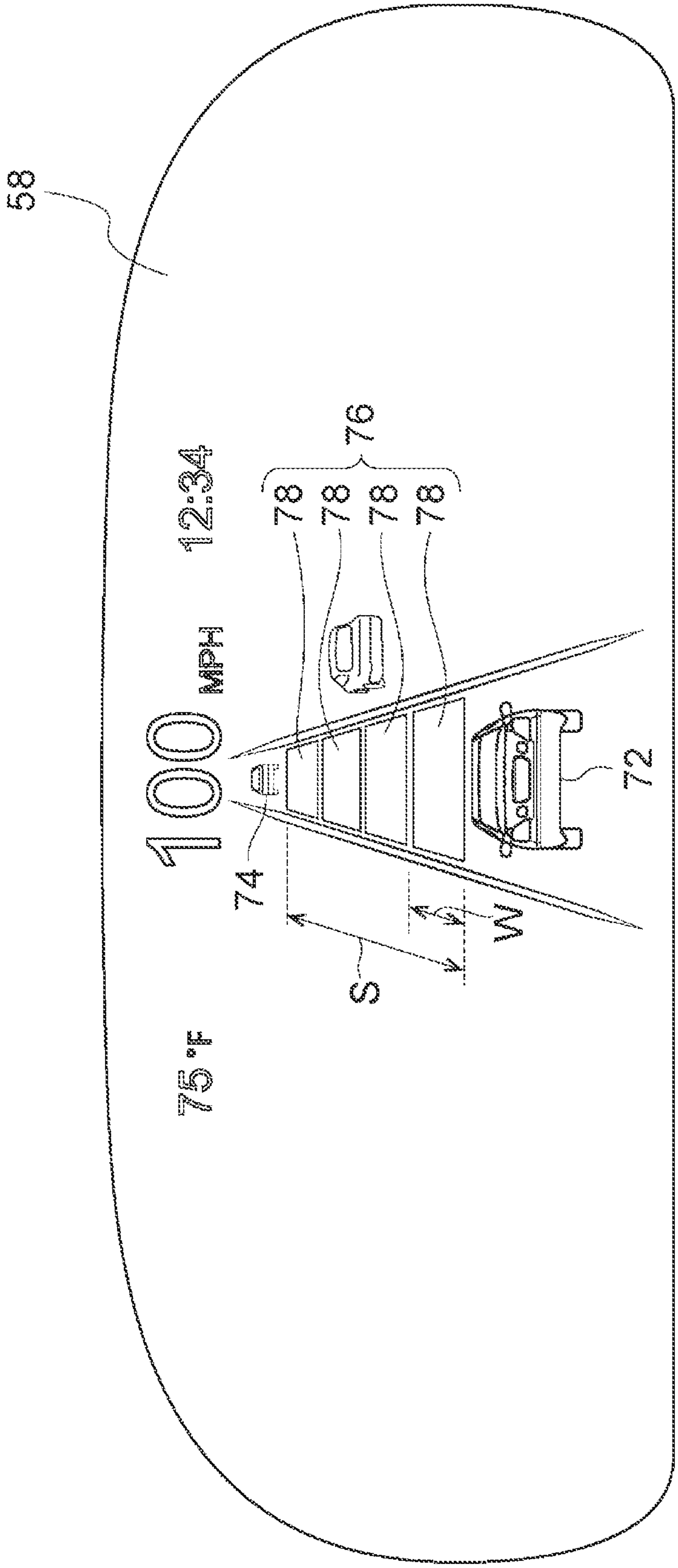
FIG. 4 is a first explanatory diagram showing a display example displayed on the meter display while the own vehicle is running.
Figure 5:
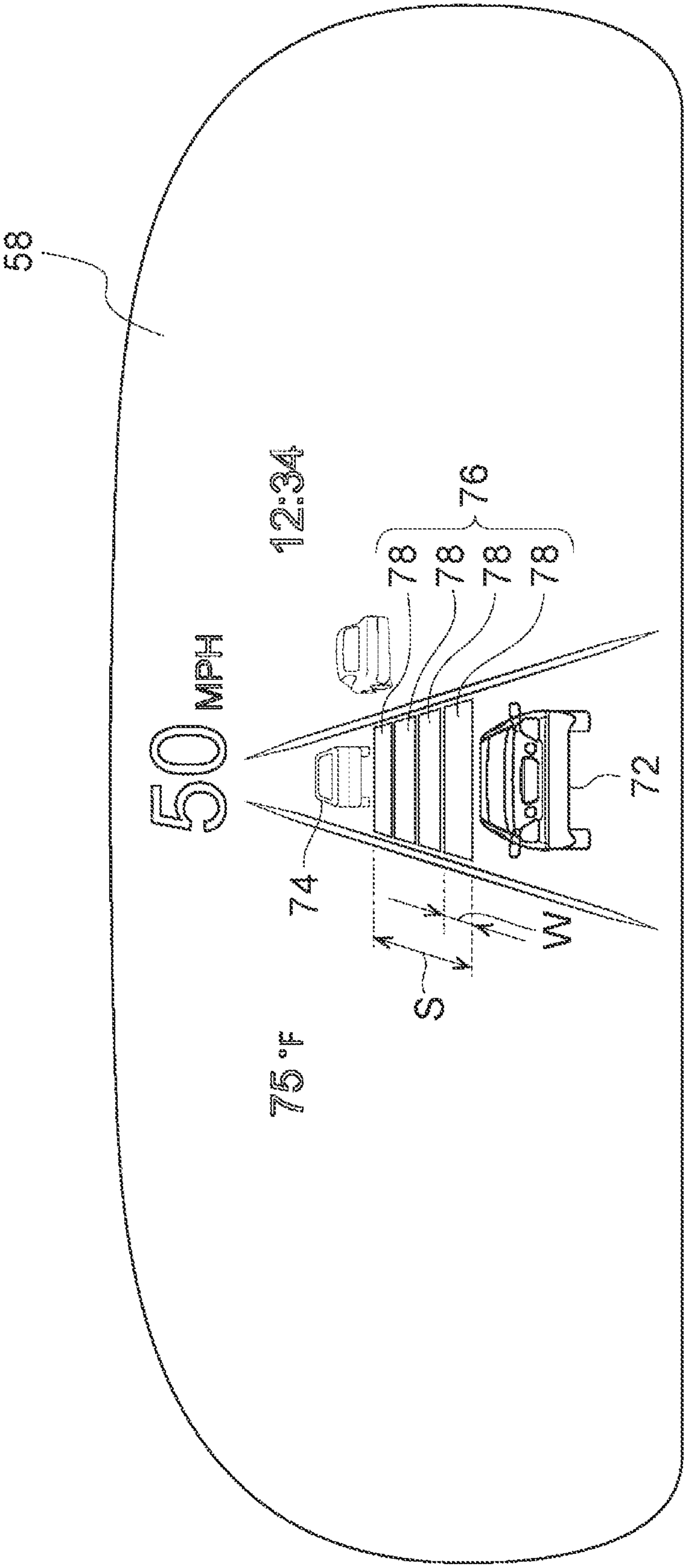
FIG. 5 is a second explanatory view showing a display example displayed on the meter display while the own vehicle is running.

FIG. 4 is a first explanatory view showing a display example displayed on the meter display 58 while the own vehicle 60 is running, and FIG. 5 is a second explanatory diagram showing a display example displayed on the meter display 58 while the own vehicle 60 is running. As an example, FIG. 4 is a display example of the meter display 58 when the vehicle speed of the own vehicle 60 is "100 km/h", and FIG. 5 is a display example when the vehicle speed of the own vehicle 60 is "50 km/h".

The meter display 58 shown in FIGS. 4 and 5 displays an own vehicle icon 72, other vehicle icon 74, and a bar graph 76 together with information such as vehicle speed and time.

On the meter display 58, the other vehicle icon 74 is displayed at a position reflecting the inter-vehicle distance between the own vehicle 60 and the preceding vehicle to be followed, and with a size corresponding to the inter-vehicle distance. For example, as is clear from a comparison of FIGS. 4 and 5, as the inter-vehicle distance increases, the other vehicle icon 74 is displayed in a smaller size and is displayed at a position spaced apart from the own vehicle icon 72. 4 and 5, the smaller the inter-vehicle distance, the larger the size of the other vehicle icon 74 and the closer it is to the own vehicle icon 72.

Also, in the meter display 58, the bar graph 76 displays the number of bars 78 corresponding to the specified value of the inter-vehicle time between the own vehicle 60 and the preceding vehicle to be followed. In this embodiment, four bars 78 are displayed when the specified value is "large", three bars 78 are displayed when the specified value is "medium", two bars 78 are displayed when the specified value is "small", and one bar 78 is displayed when the specified value is "minimum". As an example, in FIGS. 4 and 5, the bar graph 76 displays four bars 78 because the specified value is "large".

Here, when the inter-vehicle distance between the own vehicle 60 and the preceding vehicle to be followed changes, the display control ECU 42 changes the position and size of the other vehicle icon 74 along the traveling direction while changing the dimension of the bar graph 76 along the traveling direction according to the changed inter-vehicle distance. Specifically, FIG. 5 shows a display example of the meter display 58 when the inter-vehicle distance is smaller than in FIG. 4. In the display example of the meter display 58 shown in FIG. 5, the position of the other vehicle icon 74 is closer to the own vehicle icon 72 and the size of the other vehicle icon 74 is larger than in the case of FIG. 4. Also, in the display example of the meter display 58 shown in FIG. 5, the overall dimension of the bar graph 76 along the traveling direction (hereinafter referred to as dimension S) is smaller than in the case of FIG. 4. In this case, the display control ECU 42 reduces the dimension S by decreasing the dimension (hereinafter referred to as dimension W) of each bar 78 included in the bar graph 76 along the traveling direction. Conversely, when increasing the dimension S, the display control ECU 42 increases the dimension S by increasing the dimension W.

As described above, in the display control ECU 42, the CPU 44 displays the bar graph 76 on the meter display 58 when the preceding vehicle to be tracked is detected by the peripheral situation acquisition device group 14, and displays the bar graph 76. The other vehicle icon 74 is displayed so as not to be superimposed on the bar graph 76 at a position reflecting the inter-vehicle distance between the own vehicle 60 and the preceding vehicle to be followed on the forward side in the traveling direction. Here, if the other vehicle icon 74 and the bar graph 76 are overlapped on the meter display 58, a gap may occur in relation to the actual inter-vehicle distance, which may confuse the occupants in recognizing the situation. However, in the display control ECU 42, the other vehicle icon 74, which is displayed at a position reflecting the inter-vehicle distance between the own vehicle 60 and the preceding vehicle to be followed, does not overlap with the bar graph 76, thereby causing confusion in the occupant's perception of the situation. It is possible to cause the meter display 58 to display the content that is suppressed from occurring.

Further, in the display control ECU 42, when the inter-vehicle distance between the own vehicle 60 and the preceding vehicle to be followed changes, the CPU 44 changes the position of the other vehicle icon 74 along the traveling direction according to the changed inter-vehicle distance. By changing the dimension of the bar graph 76 along the direction of travel while changing, control is performed so that the other vehicle icon 74 and the bar graph 76 are not superimposed. As a result, in the display control ECU 42, for example, even if the inter-vehicle distance suddenly decreases, the other vehicle icon 74 and the bar graph 76 will not be superimposed, thereby suppressing confusion in the occupant's perception of the situation.

Second Embodiment

Next, a second embodiment of the in-vehicle system 10 according to the present embodiment will be described while omitting or simplifying portions that overlap with the above embodiment.

2nd Embodiment demonstrates the process in the in-vehicle system 10 when different vehicle has approached between the own vehicle 60 and the preceding vehicle to follow.

When different vehicle that has entered between the own vehicle 60 and the preceding vehicle to be followed is detected by the peripheral situation acquisition device group 14, the display control unit 70 displays a different vehicle icon 80 (see FIG. 6) showing the different vehicle instead of the other vehicle icon 74 so as not to overlap the bar graph 76. The different vehicle icon 80 is displayed on the front side of bar graph 76 in the traveling direction at a position that reflects the inter-vehicle distance between own vehicle 60 and the different vehicle. The different vehicle icon 80 is an example of the "different vehicle image".

In addition, when different vehicle is detected by the peripheral situation acquisition device group 14, the display control unit 70 notifies the occupant of the existence of the different vehicle using a predetermined notification unit. In this embodiment, as an example, the meter display 58 is used as the predetermined notification unit. The display control unit 70 changes the color of the bar graph 76 being displayed on the meter display 58 to notify the passenger of the presence of the different vehicle.

Figure 6:
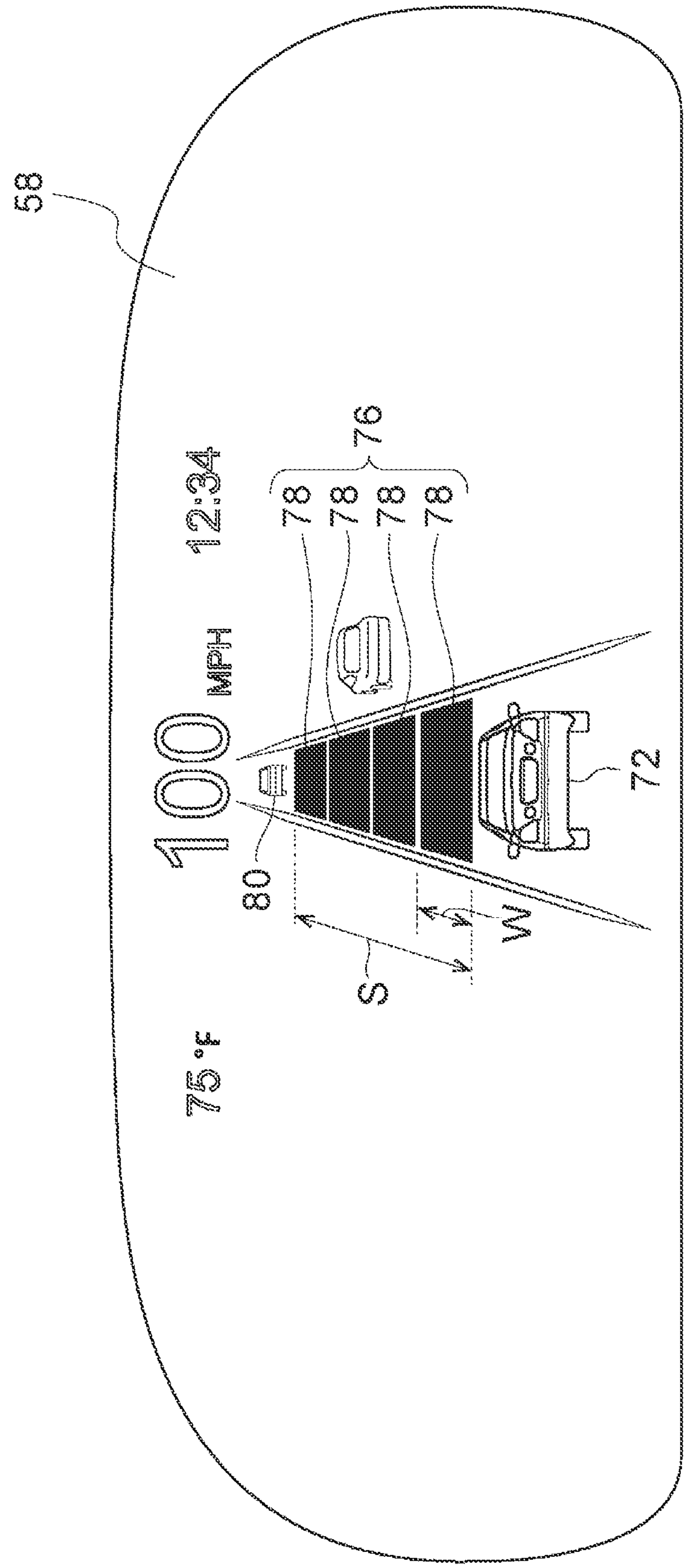
FIG. 6 is a third explanatory view showing a display example displayed on the meter display while the own vehicle is running.

FIG. 6 is a third explanatory view showing a display example displayed on the meter display 58 while the own vehicle 60 is running. As an example, FIG. 6 is a display example of the meter display 58 when the different vehicle enters between the own vehicle 60 and the preceding vehicle to be followed after the display example shown in FIG. 4 is displayed.

The meter display 58 shown in FIG. 6 displays an own vehicle icon 72 and a bar graph 76 together with information such as vehicle speed and time, as in the display example shown in FIG. 4. However, unlike the display example shown in FIG. 4, the meter display 58 shown in FIG. 6 displays the different vehicle icon 80 instead of the other vehicle icon 74 in a position that the inter-vehicle distance between the own vehicle 60 and the different vehicle is reflected on the front side of the bar graph 76 in the traveling direction. In this case, the CPU 44 of the display control ECU 42 functions as the function of the display control unit 70 to display the different vehicle icon 80 so as not to overlap the bar graph 76.

Further, unlike the display example shown in FIG. 4, the meter display 58 shown in FIG. 6 is changing the color of the bar graph 76 at the entry of the different vehicle by showing the inside of the individual bars 78 included in the bar graph 76 in black. In this case, the CPU 44 of the display control ECU 42, as a function of the display control unit 70, notifies the passenger of the presence of the different vehicle by changing the inside of the bar 78 from white to black.

As described above, in the display control ECU 42, the CPU 44 displays the other vehicle icon 74 when the peripheral situation acquisition device group 14 detects the different vehicle that has entered between the own vehicle 60 and the preceding vehicle to be followed. Instead, the different vehicle icon 80 is displayed at a position reflecting the inter-vehicle distance between the own vehicle 60 and the different vehicle on the front side of the bar graph 76 in the traveling direction so as not to overlap the bar graph 76. Here, if the different vehicle icon 80 is displayed behind the other vehicle icon 74 in the traveling direction on the meter display 58, the different vehicle icon 80 and the bar graph 76 overlap, which may cause confusion in the occupant's perception of the situation. However, in the display control ECU 42, the different vehicle icon 80 displayed in place of the other vehicle icon 74 at a position reflecting the inter-vehicle distance between the own vehicle 60 and the different vehicle does not overlap with the bar graph 76. Therefore, confusion in the occupant's perception of the situation can be suppressed.

Further, in the display control ECU 42, when the different vehicle is detected by the peripheral situation acquisition device group 14, the CPU 44 notifies the occupant of the existence of the different vehicle using the predetermined notification unit. As a result, the display control ECU 42 can make the passenger aware of the presence of the different vehicle.

In the display control ECU 42, the CPU 44 notifies the passenger of the presence of the different vehicle by changing the color of the bar graph 76 being displayed on the meter display 58. As a result, the display control ECU 42 can allow the passenger to visually recognize the presence of the different vehicle.

Others

In the above-described embodiment, the display control ECU 42 is used as an example of an information processing device. However, the display control ECU 42 is not limited to this. An external device such as a sever that is not mounted on the own vehicle 60 may be an example of an information processing device, or a combination of the display control ECU 42 and an external device may be an example of an information processing device. For example, when the combination of the display control ECU 42 and an external device is used as an example of an information processing device, the CPU of the external device may perform at least a part of each functional configuration of the CPU 44 of the display control ECU 42 shown in FIG. 2. In this case, the control processing shown in FIG. 3 is executed by one processor of the CPU 44 of the display control ECU 42 or the CPU of the external device, or by a combination of a plurality of processors of the CPU 44 of the display control ECU 42 and the CPU of the external device.

In the above-described embodiment, the meter display 58 is used as an example of the display unit. However, the present disclosure is not limited to this. The other display device mounted on the own vehicle 60 such as HUD 56 or a mobile terminal such as a smartphone of the occupant installed in the vehicle may be an example of a display unit.

In the above embodiment, control is performed so that the other vehicle icon 74 or the different vehicle icon 80 does not overlap with the bar graph 76 during execution of the inter-vehicle time control ACC, but the timing of performing the control is not limited to this. For example, in a case where the inter-vehicle time control ACC is not executed, when the other vehicle running in front of the own vehicle 60 in the traveling direction or the different vehicle that has entered between the own vehicle 60 and the other vehicle is detected by the peripheral situation acquisition device group 14, the CPU 44 of display control ECU 42 may perform the above controls. In other words, the above control can be executed regardless of whether the own vehicle 60 is traveling under the occupant's operation or automatically traveling without the occupant's operation.

In the above embodiment, the meter display 58 is used as the predetermined notification unit to notify the occupant of the presence of different vehicle, but the notification unit is not limited to this. For example, instead of or in addition to the meter display 58, a speaker mounted on the own vehicle 60 is used as the predetermined notification unit, and the presence of different vehicle may be notified to the occupants by outputting a predetermined sound from the speaker.

Note that the control processing executed by the CPU 44 by reading the software (program) in the above embodiment may be executed by various processors other than the CPU. Examples of the processor in this case are a programmable logic device (PLD) whose circuit configuration can be changed after manufacturing such as a field-programmable gate array (FPGA), a dedicated electric circuit that is a processor having a specially designed circuit configuration for executing specific processing such as an application specific integrated circuit (ASIC), or the like. Also, the control processing may be executed by one of these various processors, or a combination of two or more processors of the same or different type (for example, a plurality of FPGAs, a combination of a CPU and an FPGA, etc.). Further, a hardware configuration of the various processors is, more specifically, an electric circuit in which circuit elements such as semiconductor elements are combined.

Further, in the above-described embodiment, the display control program 54 is pre-stored (installed) in the storage unit 48, but the present disclosure is not limited to this. The display control program 54 may be provided in a form recorded in a recording medium such as a compact disk read only memory (CD-ROM), a digital versatile disk read only memory (DVD-ROM), and a universal serial bus (USB) memory. Also, the display control program 54 may be downloaded from an external device via a network.

What is claimed is:

1. An information processing device comprising a processor configured to:

display a first image on a meter display, the first image indicating a first vehicle;

determine whether a second vehicle is traveling in front of the first vehicle in a traveling direction of the first vehicle, the second vehicle being different from the first vehicle;

control inter-vehicle time that is a time required for the first vehicle to reach a position at which the second vehicle is present at a predetermined time;

display a graphic that schematizes information related to the inter-vehicle time on the meter display, in a case where the processor determines that the second vehicle is running in front of the first vehicle in the traveling direction;

display a second image representing the second vehicle in a first position that reflects a first inter-vehicle distance between the first vehicle and the second vehicle between a top portion of the meter display and a front side of the graphic in the traveling direction on the meter display;

display the second image in a smaller size on the meter display than a size of the second image previously displayed in response to an increase in the first inter-vehicle distance;

determine whether a third vehicle has entered between the first vehicle and the second vehicle, the third vehicle being different from the first vehicle and the second vehicle, in a case where the processor has not started control for the inter-vehicle time at the predetermined time; and remove the second image from the meter display and display a third image representing the third vehicle at a second position reflecting a second inter-vehicle distance between the first vehicle and the third vehicle, the second position being in front of the graphic in the traveling direction and spaced apart from the graphic on the meter display, in a case where the processor determines that the third vehicle has entered between the first vehicle and the second vehicle and has not started control for the inter-vehicle time at the predetermined time.

2. The information processing device according to claim 1, wherein the processor is further configured to:

determine that the first inter-vehicle distance changes; and change a present position of the second image displayed on the meter display to a different position of the second image displayed on the meter display, the different position being from the present position, and change a dimension of the graphic along the traveling direction displayed on the meter display, in a case where the processor determines that the first inter-vehicle distance changes, such that the second image remains displayed in an area between the top portion of the meter display and the front side of the graphic in the traveling direction.

3. The information processing device according to claim 1, wherein the processor is further configured to notify an occupant of presence of the third vehicle on the meter display in a case where the processor determines that the third vehicle has entered between the first vehicle and the second vehicle.

4. The information processing device according to claim 3, wherein the processor is configured to notify the occupant of the presence of the third vehicle by at least one of changing color of the graphic on the meter display and outputting sound from a speaker.

5. The information processing device according to claim 3, wherein the processor is further configured to:

display the graphic in white in a case where the processor determines that the second vehicle is running in front of the first vehicle in the traveling direction; and display the graphic in black in a case where the processor displays the graphic in white and the processor determines that the third vehicle has entered between the first vehicle and the second vehicle.

6. The information processing device according to claim 4, wherein the processor is further configured to:

display the graphic in white in a case where the processor determines that the second vehicle is running in front of the first vehicle in the traveling direction; and in a case where the processor displays the graphic in white and the processor determines that the third vehicle has entered between the first vehicle and the second vehicle, display the graphic in black, and output a predetermined sound from the speaker.

7. The information processing device according to claim 5, wherein the processor is further configured to output a predetermined sound from a speaker in a case where the processor determines that the third vehicle has entered between the first vehicle and the second vehicle.

8. The information processing device according to claim 1, wherein:

the graphic consists of one or more bars, the number of the one or more bars corresponding to the predetermined time; and the processor is further configured to display the one or more bars depending on the predetermined time on the meter display.

9. The information processing device according to claim 8, wherein the number of the one or more bars displayed on the meter display increases in response to an increase of the predetermined time.

10. The information processing device according to claim 8, wherein:

the predetermined time is one of a first duration, a second duration, a third duration, and a fourth duration;

the first duration, the second duration, the third duration, and the fourth duration are in an ascending order;

the fourth duration is the longest among the first duration, the second duration, the third duration, and the fourth duration; and the processor is further configured to display one of the one or more bars on the meter display in a case where the predetermined time is the first duration, display two of the one or more bars on the meter display in a case where the predetermined time is the second duration, display three of the one or more bars on the meter display in a case where the predetermined time is the third duration, and display four of the one or more bars on the meter display in a case where the predetermined time is the fourth duration.

* * * * *